(12) United States Patent
Jiang et al.

(10) Patent No.: US 11,777,857 B2
(45) Date of Patent: *Oct. 3, 2023

(54) SERVICE FORWARDING METHOD AND NETWORK DEVICE

(71) Applicant: HUAWEI TECHNOLOGIES CO., LTD., Shenzhen (CN)

(72) Inventors: Yuanlong Jiang, Dongguan (CN); Hengjun Zhu, Dongguan (CN); Hongguang Guan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/475,531

(22) Filed: Sep. 15, 2021

(65) Prior Publication Data

US 2022/0006744 A1 Jan. 6, 2022

Related U.S. Application Data

(63) Continuation of application No. 16/597,401, filed on Oct. 9, 2019, now Pat. No. 11,140,085, which is a
(Continued)

(30) Foreign Application Priority Data

Jun. 16, 2017 (CN) .......................... 201710461612.4

(51) Int. Cl.
*H04L 47/22* (2022.01)
*H04L 47/2408* (2022.01)
(Continued)

(52) U.S. Cl.
CPC .......... *H04L 47/22* (2013.01); *H04L 47/2408* (2013.01); *H04L 47/28* (2013.01); *H04L 47/36* (2013.01)

(58) Field of Classification Search
None
See application file for complete search history.

(56) References Cited

U.S. PATENT DOCUMENTS

| 2011/0292940 A1* | 12/2011 | Okamoto ................ H04L 45/50 370/392 |
| 2012/0182892 A1 | 7/2012 | Frazier et al. |

(Continued)

FOREIGN PATENT DOCUMENTS

| CN | 101087440 A | 12/2007 |
| CN | 101364856 A | 2/2009 |

(Continued)

OTHER PUBLICATIONS

Jiang Weicheng:"The Research of Packet Scheduling Based on Multi-priorities Queues," Hunan Normal University, published in docin on Jan. 1, 2013. total 100 pages. With English partial translation, including abstract.
(Continued)

*Primary Examiner* — Saumit Shah
(74) *Attorney, Agent, or Firm* — Rimon PC

(57) ABSTRACT

This application relates to the field of communications technologies, and discloses a service forwarding method and a network device that performs such method. The method includes: forwarding, by a first network device, a data packet of a first service to a second network device in a period ($T_1$); and if the data volume of the forwarded first service reaches a threshold, forwarding, by the first network device, a data packet of a second service to the second network device. The first service is a low-latency service, and the second service is a non-low-latency service. In addition, the period ($T_1$) is determined based on a delay allowed by a device for forwarding the data packet of the first service, and the
(Continued)

threshold is a value determined based on a maximum transmission rate of the first service.

16 Claims, 14 Drawing Sheets

Related U.S. Application Data continuation of application No. PCT/CN2018/091561, filed on Jun. 15, 2018.

(51) Int. Cl.
 *H04L 47/28* (2022.01)
 *H04L 47/36* (2022.01)

(56) References Cited

U.S. PATENT DOCUMENTS

| | | | |
|---|---|---|---|
| 2014/0169162 A1 | 6/2014 | Romano et al. | |
| 2015/0055456 A1 | 2/2015 | Agarwal et al. | |
| 2015/0071074 A1 | 3/2015 | Zaidi et al. | |
| 2015/0146523 A1* | 5/2015 | Yang | H04L 45/306 |
| | | | 370/230 |
| 2015/0188804 A1* | 7/2015 | Ashwood-Smith | |
| | | | H04L 47/283 |
| | | | 370/392 |
| 2018/0270144 A1 | 9/2018 | Jiang et al. | |

FOREIGN PATENT DOCUMENTS

| | | |
|---|---|---|
| CN | 101414974 A | 4/2009 |
| CN | 102014052 A | 4/2011 |
| CN | 102035732 A | 4/2011 |
| CN | 102196583 A | 9/2011 |
| CN | 102404133 A | 4/2012 |
| CN | 102594802 A | 7/2012 |
| CN | 103312613 A | 9/2013 |
| CN | 103379029 A | 10/2013 |
| CN | 104301256 A | 1/2015 |
| CN | 104486235 A | 4/2015 |
| CN | 105187949 A | 12/2015 |
| CN | 105897365 A | 8/2016 |
| CN | 106603147 A | 4/2017 |
| CN | 106713141 A | 5/2017 |
| CN | 106851769 A | 6/2017 |
| EP | 2466824 B1 | 5/2014 |

OTHER PUBLICATIONS

C. Gunther, Ed., et al. (Internet Engineering Task Force), Deterministic Networking Professional Audio Requirements, draft-gunther-detnet-proaudio-req-01, Mar. 31, 2015 total 12 pages.

D. Awduche et al. RSVP-TE: Extensions to RSVP for LSP Tunnels, IETF RFC 3209, Dec. 1, 2001. total 61 pages.

S. Shenker et al. Specification of Guaranteed Quality of Service, RFC2212, Sep. 1, 1997, total 20 pages.

C. Filsfils, Ed et al. (Network Working Group), Segment Routing Architecture, draft-ietf-spring-segment-routing-08, May 11, 2016. total 24 pages.

IEEE Instrumentation and Measurement Society, IEEE 1588V2,IEEE Std 1588-2008 (Revision of IEEE Std 1588-2002), IEEE Standard for a Precision Clock Synchronization Protocol for Networked Measurement and Control Systems,IEEE Instrumentation and Measurement Society,Technical Committee on Sensor Technology (TC-9),dated Jul. 24, 2008,total 289 pages.

IEEE SA-Standards Board, IEEE 802.1Qbv-2015, Bridges and Bridged Networks Amendment 25: Enhancements for Scheduled Traffic, Dec. 5, 2015. total 57 pages.

* cited by examiner

SERVICE FORWARDING METHOD AND NETWORK DEVICE

CROSS-REFERENCE TO RELATED APPLICATIONS

This application is a continuation of U.S. patent application Ser. No. 16/597,401, filed on Oct. 9, 2019, which is a continuation of International Application No. PCT/CN2018/091561, filed on Jun. 15, 2018, which claims priority to Chinese Patent Application No. 201710461612.4, filed on Jun. 16, 2017. All of the aforementioned applications are hereby incorporated by reference in their entireties.

TECHNICAL FIELD

This application relates to the field of communications technologies, and in particular, to a service forwarding method and a network device for implementing a service forwarding method.

BACKGROUND

With rapid development of the fourth generation mobile communications technology, services increasingly impose a strict low latency requirement on network transmission, for example, the information and command monitoring service for a smart grid. Although this service has a low bandwidth requirement, it requires an excessively low latency in network transmission. Otherwise, monitoring information and instructions of the grid cannot be sent and received in time, and the entire grid may break down. For another example, a live broadcast of a performance or game usually requires a delay less than 15 milliseconds.

Currently, in a multiprotocol label switching (MPLS) network, different services may be provided for different service data streams based on priorities, so that low-latency and low-packet-loss-rate services with bandwidth guarantees are provided for voice and video data streams. Specifically, a priority-based scheduling method mainly includes strict priority (SP) scheduling and common weighted round robin (WRR) scheduling. In the strict priority scheduling, different priorities are set for different services, and a high-priority service is always preferentially forwarded, to ensure low latency and low packet loss rate. However, if high-priority services always occupy broadband, low-priority services may not get transmitted at all. In the so-called WRR scheduling, bandwidth is allocated to each service based on a weight, to ensure that high-weighted services are transmitted first. In any of the priority-based scheduling methods, because the actual delay of a service in transmission is unpredictable, it cannot be ensured that a specific latency requirement will be met for the service.

SUMMARY

Embodiments of this application provide a service forwarding method and a network device, to meet a specific transmission latency requirement of a low-latency service, and to improve the service quality of the low-latency service.

To achieve the foregoing objectives, the following technical solutions are provided in the embodiments of this application.

According to a first aspect, a service forwarding method is provided, and the method includes: forwarding, by a first network device, a data packet of a first service to a second network device in a period ($T_1$); and if a data volume of the forwarded first service reaches a threshold, forwarding, by the first network device, a data packet of a second service to the second network device. The first service is a low-latency service, and the second service is a non-low-latency service. The period ($T_1$) is a duration determined based on a delay allowed by the first network device for forwarding the data packet of the first service. The threshold is a value determined based on a maximum transmission rate of the first service. By using this service forwarding method, the network transmission delay of the low-latency service can be accurately controlled, so that it can be ensured that the network delay of the low-latency service is lower than an allowed minimum delay value, and the service quality requirement of the low-latency service can be met.

The second network device is a next hop of the first network device in a direction from an ingress node to an egress node on a path. The path may be used to forward the first service. The path used to forward the first service and a path used to forward the second service have an overlapping path. The path used to forward the first service includes the first network device, the second network device, and a path between the first network device and the second network device. The path used to forward the second service includes the first network device, the second network device, and the path between the first network device and the second network device. A low-latency service is a real-time service that has a specific requirement on an indicator of a network transmission delay, such as a financial and electronic transaction service, a video conference service, or a touch-based Internet service. A non-low-latency service is a service that has no specific requirement on the indicator of the network transmission delay.

In a possible design, if the first network device is an ingress node, the first network device acquires a service request of the first service before starting to forward the data packet of the first service. The service request includes a first delay ($t_m$), and the first delay ($t_m$) is a transmission delay value allowed during transmission of the first service from the ingress node to the egress node. The first network device obtains a second delay ($t_d$) and a hop count (h). The second delay is a transmission delay value generated by a physical link included on a path. The hop count is a hop count included on the path, and is a hop count between an ingress node of the path and an egress node of the path. The path is a path used to send the data packet of the first service. The first network device determines the period ($T_1$) based on the first delay ($t_m$), the second delay ($t_d$), and the hop count (h). The value of the period ($T_1$) is less than ($t_m-t_d$)/(h+1). The first network device may obtain the service request of the first service from user equipment or a control device.

In a possible design, the first network device obtains a first rate (P) and a packet length (M). The first rate (P) is a maximum value of the quantity of data packets allowed to be sent on the path in a unit time. The packet length (M) is a size of the maximum data packet allowed to be sent on the path. The first network device obtains a second rate based on the first rate (P) and the packet length (M). The second rate is a maximum value of the total quantity of bytes of the data packet of the first service that is allowed to be sent on the path in a unit time. The first network device then determines the threshold based on the period ($T_1$) and the second rate, and the threshold is less than or equal to a product of the period ($T_1$) and the second rate.

Therefore, the first network device preferentially forwards the data packet of the first service in the period ($T_1$), and ensures that the data volume of the first service transmitted in the period ($T_1$) can reach the threshold, so that transmission of the first service from the ingress node to the egress node can meet a transmission latency requirement.

In a possible design, the service request of the first service includes a time interval, which is a time period for transmitting the data packet of the first service on the path used to forward the data packet of the first service. In this case, after determining the period ($T_1$) and a second rate, the first network device may send a first path establishment request to a next-hop node, namely the second network device, on the path. The first path establishment request includes the time interval, the period ($T_1$), and the second rate. A path that is to be established according to the first path establishment request can meet a transmission latency requirement of the first service.

In a possible design, if the first network device is an intermediate node, the first network device obtains a second path establishment request. The second path establishment request includes a time interval, the period ($T_1$), and a second rate. Then, the first network device determines, based on the second path establishment request, whether the first network device supports, in the time interval, a data volume of the first service sent in the period ($T_1$) in reaching the threshold. The threshold is a product of the period ($T_1$) and the second rate. The first network device may determine, based on a forwarding resource of the first network device, whether the first network device supports, in the time interface, the data volume of the first service sent in the period ($T_1$) in reaching the threshold.

In a possible design, if a plurality of low-latency services on the first network device need to be forwarded, the first network device starts a corresponding timer for each low-latency service, and forwards a low-latency service based on a corresponding timer of the low-latency service. In this way, when the first network device needs to forward data packets of a plurality of low-latency services in a same time period, the methods disclosed in this application can also ensure that network transmission of each low-latency service can meet a transmission latency requirement of the low-latency service, to meet service requirements of a plurality of services.

In a possible design, if a plurality of low-latency services in the first network device need to be forwarded, the first network device starts a timer, and timing duration of the timer is the duration with a shortest corresponding period in the plurality of low-latency services. Data packets of the plurality of low-latency services are forwarded within the timing duration of the timer. If the quantity of bytes of the data packets of the plurality of forwarded low-latency services reaches a threshold, a non-low-latency service starts to be forwarded. The threshold corresponding to the data packets of the plurality of low-latency services is the product of the sum of rates corresponding to the plurality of low-latency services and the timing duration of the timer.

In a possible design, before sending, by a first network device, a data packet of a first service to a second network device in a period ($T_1$), the method further includes: receiving, by the first network device, the data packet of the first service and a data packet of a third service in a same time period; and if, on a same device, a delay required for sending the data packet of the third service is greater than or equal to a delay required for sending the data packet of the first service, determining, by the first network device, the threshold based on the period ($T_1$), a second rate, and a third rate. The threshold is less than or equal to the product of the period ($T_1$) and the sum of the second rate and the third rate. The second rate is the maximum value of the total quantity of bytes of the data packet of the first service that is allowed to be sent on the path in a unit time. The third rate is the maximum value of the total quantity of bytes of the data packet of the third service that is allowed to be sent on the path in a unit time.

According to a second aspect, a first network device is provided, and the first network device includes a unit configured to implement the first aspect or any possible design of the first aspect.

According to a third aspect, a first network device is provided. The first network device includes a processor, a memory, and a communications interface. The processor reads an instruction stored in the memory from the memory, and performs, through the communications interface, the method provided in the first aspect or any possible design of the first aspect.

According to a fourth aspect, an embodiment of this application provides a computer-readable storage medium, e.g., non-transitory computer-readable storage medium. The computer-readable storage medium stores an instruction or instructions. When the instruction or instructions are run on a computer, the computer is enabled to perform the method provided in the first aspect or any possible design of the first aspect.

According to a fifth aspect, an embodiment of this application provides a computer program product that includes an instruction or an instruction set, and when the computer program product is run on a computer, the computer is enabled to perform the method provided in the first aspect or any possible design of the first aspect.

The embodiments of this application provide the service forwarding method and the network device. The first network device divides a time interval for sending a low-latency service into a plurality of periods, and each period is $T_1$. In $T_1$, the first network device preferentially forwards a data packet of the low-latency service, and ensures that a data volume of the forwarded low-latency service can reach a threshold. Therefore, a transmission delay value of the low-latency service from an ingress node to an egress node can be accurately controlled, thereby ensuring that the transmission delay value of the low-latency service is less than a first delay, and satisfying a service quality requirement of the low-latency service.

DESCRIPTION OF EMBODIMENTS

The following clearly describes the technical solutions in the embodiments of this application with reference to the accompanying drawings in the embodiments of this application.

Figure 1A:
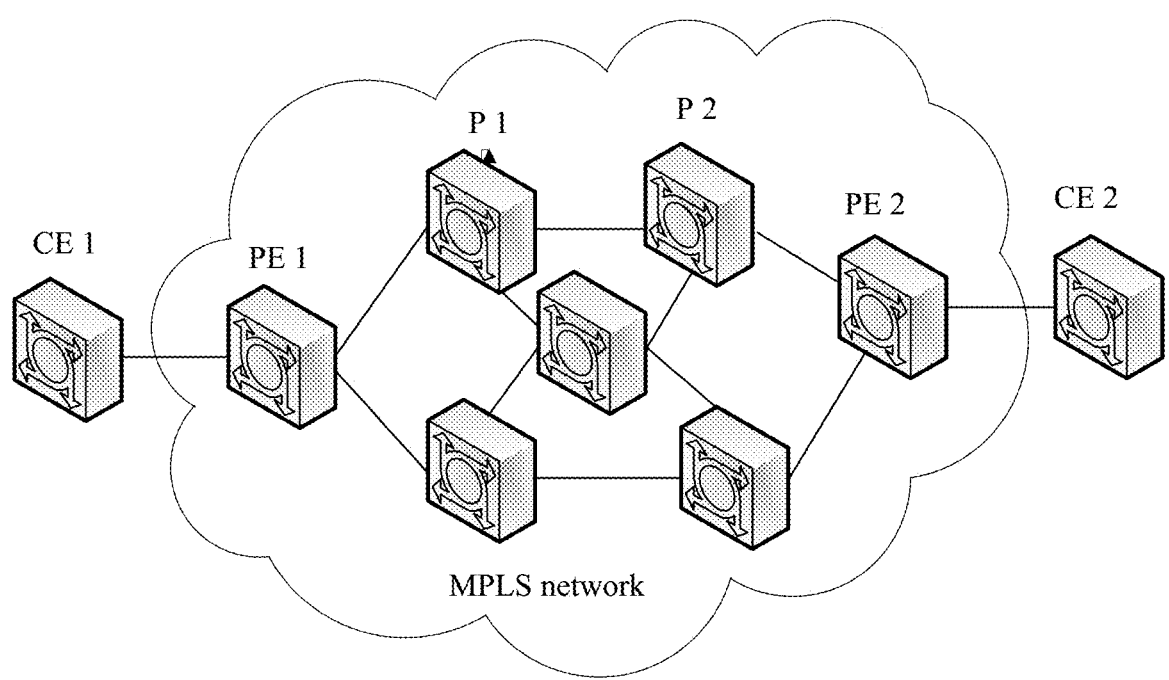
FIG. 1a is a schematic structural diagram of an MPLS network according to an embodiment of this application.

The embodiments of this application may be applied to a packet switching network (PSN), for example, an Multiprotocol Label Switching (MPLS) network. FIG. 1a shows a topology structure of an MPLS network. The MPLS network includes provider edge (PE) devices and provider (P) devices. AP device is an intermediate node device in the MPLS network. A P device is mainly configured to forward a service. A P device may be a router, a switch, or the like. A PE device is an edge node device in the MPLS network. APE device may be an ingress node or an egress node. A PE device is mainly configured to access or output a service. A PE device may be a router, a switch, an optical line terminal (OLT), a multiple dwelling unit (MDU) device, or a broadband remote access server (BRAS). Specifically, the MPLS network accesses a customer edge (CE) device by using a PE device, to provide a user with a highly efficient, fast, and reliable data transmission service. A CE device is a user-side device. A CE device may be a personal broadband access client device, an egress gateway of an enterprise, an egress gateway of a data center, or the like. A network to which a CE device belongs may be a user network, a corporate network, a data center, or a cloud network. A connection link between a PE device and a CE device may be an Ethernet link, a passive optical network (PON) link, various types of digital subscriber line (DSL) links, or the like.

Figure 1B:
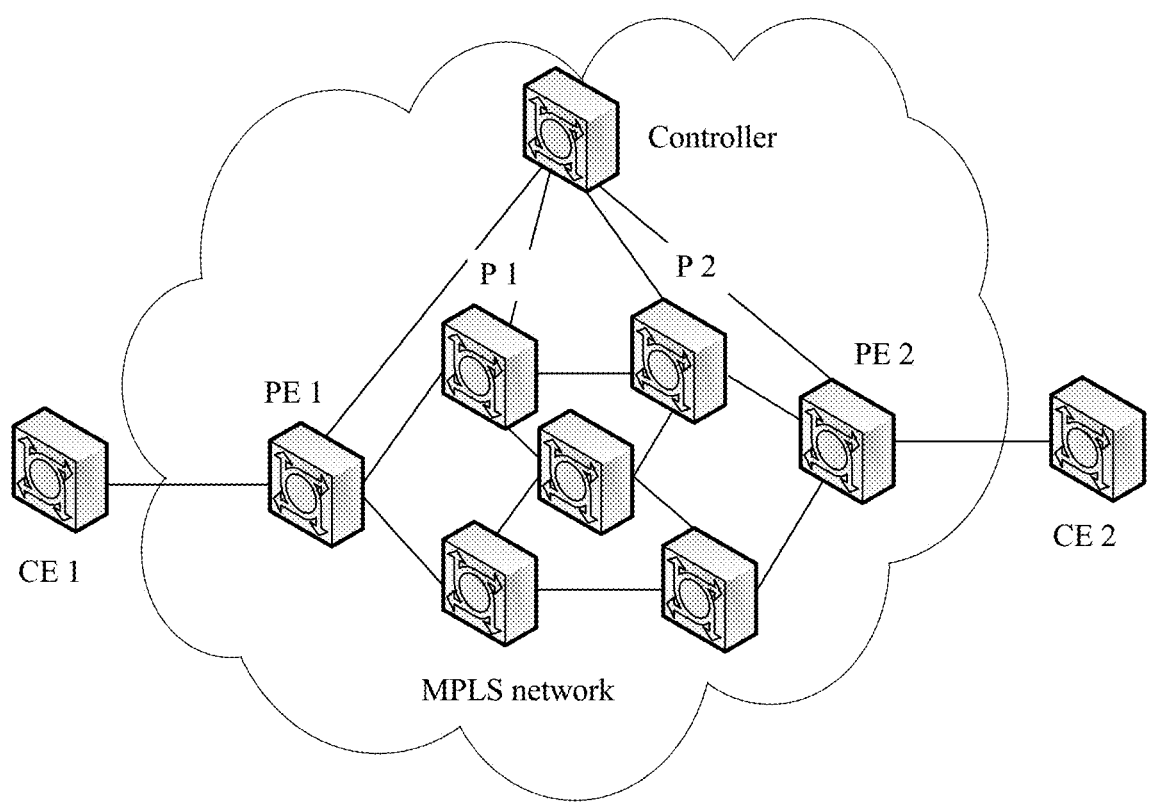
FIG. 1b is a schematic structural diagram of another MPLS network according to an embodiment of this application.

Optionally, FIG. 1b shows a topology structure of another MPLS network. The MPLS network includes a controller, for example, a software-defined networking (SDN) controller. The controller is configured to: receive a service request, establish a path used to forward the service based on the service request, and send a path establishment request to each network device on the path.

It should be noted that in the embodiments of this application, a frequency synchronization protocol and a time synchronization protocol, for example, a synchronous Ethernet (SyncE) protocol or a precision time protocol (PTP), may be pre-deployed in the MPLS network. In this case, each network device in the MPLS network can have an accurate network-wide synchronization frequency and time, and this helps each network device transmit service data based on the synchronization time.

In addition, only two PE devices and five P devices are shown in FIG. 1a and FIG. 1b. However, the quantity of PE devices and the quantity of P devices in the MPLS network and a specific connection relationship among these devices are not limited in the embodiments of this application.

Moreover, one PE device may be connected to a plurality of CE devices, and each CE device may handle the data volume of a plurality of services at the same time.

The MPLS network may implement different services for different service data based on priorities. However, an existing priority-based scheduling method, such as a strict priority scheduling method and a WRR scheduling method, cannot ensure that the delay of transmitting a service data stream over the MPLS network i lower than a specific transmission delay value. However, with the development of the fourth generation (4G) mobile communications technology, more services require an accurate delay value during network transmission. For example, a live broadcast of a performance or game usually requires a delay less than 15 milliseconds. In this case, a method provided in the embodiments of this application may be used to ensure that the delay value of transmitting this type of services over the MPLS network is less than 15 milliseconds.

Figure 2A:
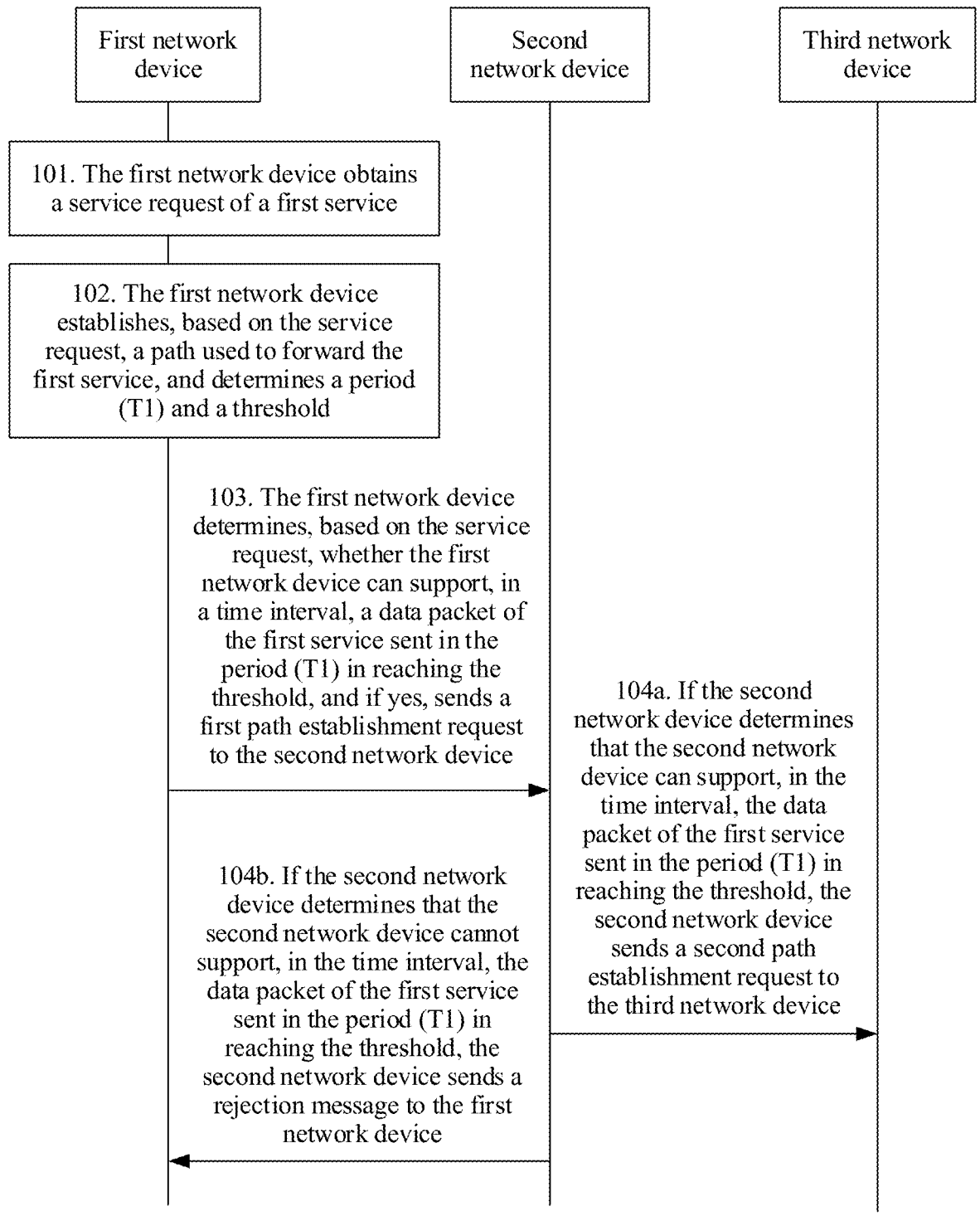
FIG. 2a is a flowchart of a service forwarding method according to an embodiment of this application.

If the method provided in the embodiments of this application is applied to the network shown in FIG. 1a, before a data packet of a service is forwarded, the method further includes a process of establishing a path used to forward the data packet of the service. As shown in FIG. 2a, the method specifically includes the following steps.

101. A first network device obtains a service request of a first service.

For example, the first network device is an ingress node, in an MPLS network, on a path used to forward the first service, such as a PE 1 directly connected to a CE 1. The first service is a low-latency service. The low-latency service is a real-time service that has a specific requirement on an indicator of a network transmission delay. For example, the low-latency service may be a financial and electronic transaction service, a video conference service, a touch-based Internet service, an Internet of Vehicles service, a fifth generation (5G) mobile bearer network service, or a live broadcast service of a sports event.

Specifically, the first network device may obtain the service request of the first service from user equipment. The service request includes a first delay ($t_m$) and a time interval. The first delay ($t_m$) is a transmission delay value allowed during transmission of the first service from the ingress node to an egress node. The first delay ($t_m$) includes a transmission delay value generated by a physical link on the path used to forward the first service and a transmission delay value generated by each node included on the path. The time interval is a time period for transmitting the data packet of the first service on the path, for example, ($t_1$, $t_2$). In this case, according to a network transmission requirement of the first service, the total transmission delay on the path used to forward the first service in ($t_1$, $t_2$) should be less than or equal to the first delay ($t_m$).

102. The first network device establishes, based on the service request, a path used to forward the data packet of the first service, and determines a period ($T_1$) and a threshold.

Specifically, after receiving the service request of the first service, the first network device determines, based on the information carried in the service request, for example, information about the first delay ($t_m$), a network address of the user equipment, or a bandwidth requirement of the first service, the path used to forward the data packet of the first service. After the path is established, the first network device determines a second delay ($t_d$) and the quantity of network devices included on the path according to a related protocol. The second delay is a transmission delay value generated by a physical link included on the path. The quantity of network devices included on the path is the hop count (h) included on the path plus one. Then, the first network device determines the period ($T_1$) based on the first delay ($t_m$) the second delay ($t_d$), and the hop count (h). Optionally, the value of the period ($T_1$) may be less than the value of ($t_m-t_d$)/(h+1).

For example, as shown in FIG. 1a, it is assumed that a transmission delay value, namely the first delay, allowed during transmission of the first service from the ingress node to the egress node is 15 milliseconds. The path, established in the MPLS network, used to forward the data packet of the first service is PE 1-P 1-P 2-PE 2. The hop count is 3. A transmission delay value, namely the second delay, generated by a physical link in the entire path is 5 milliseconds. A period for forwarding the first service by the first network node is less than 2.5 milliseconds, for example, 2.4 milliseconds or 2 milliseconds.

In one embodiment, a method for determining the threshold includes the following steps.

1. The first network device obtains a first rate (P) and a packet length (M).

The first rate (P) is a maximum value of a quantity of data packets allowed to be sent on the path in a unit time, and the first rate may be an empirical value or a statistical value obtained by the user equipment. In this case, the first network device may obtain the first rate (P) from the service request. The first rate may be alternatively allocated to the first service by the MPLS network. In this case, the ingress node or a controller may obtain the first rate (P) directly from the configuration of the network.

The packet length (M) is a size of a maximum data packet allowed to be sent on the path. When establishing the path, the first network device may obtain the packet length (M) by performing a maximum transmission unit (MTU) discovery of the path. Generally, the packet length (M) is related to a communications interface, for example, a network interface card or a serial port.

2. The first network device determines a second rate based on the first rate (P) and the packet length (M).

The second rate is a maximum value of a total quantity of bytes of the data packet of the first service that is allowed to be sent on the path in a unit time, and the second rate may be, for example, determined as the product of the first rate (P) and the packet length (M).

3. The first network device determines the threshold based on the period ($T_1$) and the second rate. The threshold is less than or equal to the product of the period ($T_1$) and the second rate.

103. The first network device determines, based on the service request, whether the first network device can support, in the time interval, the data packet of the first service sent in the period ($T_1$) in reaching the threshold, and if yes, sends a first path establishment request to a second network device.

The second network device is a next-hop node of the first network device on the path used to forward the data packet of the first service. The first path establishment request includes the time interval, the period ($T_1$), and the second rate.

Specifically, the first network device determines, based on the information carried in the service request and the determined threshold, whether a local resource supports transmission of the data packet of the first service, for example, whether the first network device meets a corresponding bandwidth requirement, and whether the first network device can allocate a corresponding packet queue to the first service, to determine whether the first network device supports, in the time interval, the data packet of the first service sent in the period ($T_1$) in reaching the threshold. If the first network device can support, in the time interval, the data packet of the first service sent in the period ($T_1$) in reaching the threshold, the first network device reserves a resource used to forward the data packet of the first service, and sends the first path establishment request to the second network device. If the first network device cannot support, in the time interval, the data packet of the first service sent in the period ($T_1$) in reaching the threshold, the first network device returns a rejection message to the user equipment, and the user equipment selects another transmission path.

104a. If the second network device determines that the second network device can support, in the time interval, the data packet of the first service sent in the period ($T_1$) in reaching the threshold, the second network device sends a second path establishment request to a third network device.

The second path establishment request includes the time interval, the period ($T_1$), and the second rate. The third network device is a next-hop node of the second network device on the path used to forward the data packet of the first service.

Specifically, after receiving the first path establishment request, the second network device may obtain information about the time period, the period ($T_1$), and the second rate from the first path establishment request, and the threshold is less than or equal to a product of the period ($T_1$) and the second rate. Further, it is determined whether the second network device supports, in the time period, the data packet of the first service sent in the period ($T_1$) in reaching the threshold. For a specific determining process, refer to step 103. Details are not described herein again. If the second network device supports, in the time period, the data packet of the first service sent in the period ($T_1$) in reaching the threshold, the second network device reserves a resource used to forward the data packet of the first service, and sends the second path establishment request to a next-hop node, namely the third network device, on the path, as shown by 104a in the figure. If the second network device does not support, in the time period, the data packet of the first service sent in the period ($T_1$) in reaching the threshold, the second network device returns a rejection request to the first network device, and the first network device re-determines a path used to forward the data packet of the first service, as shown by 104b in the figure.

104b. If the second network device determines that the second network device cannot support, in the time interval, the data packet of the first service sent in the period ($T_1$) in reaching the threshold, the second network device sends a rejection message to the first network device.

It should be noted that if the first network device is an intermediate node, for example, P1, on the path used to forward the data packet of the first service, the first network device may be further used to perform steps 104a and 104b.

Figure 2B:
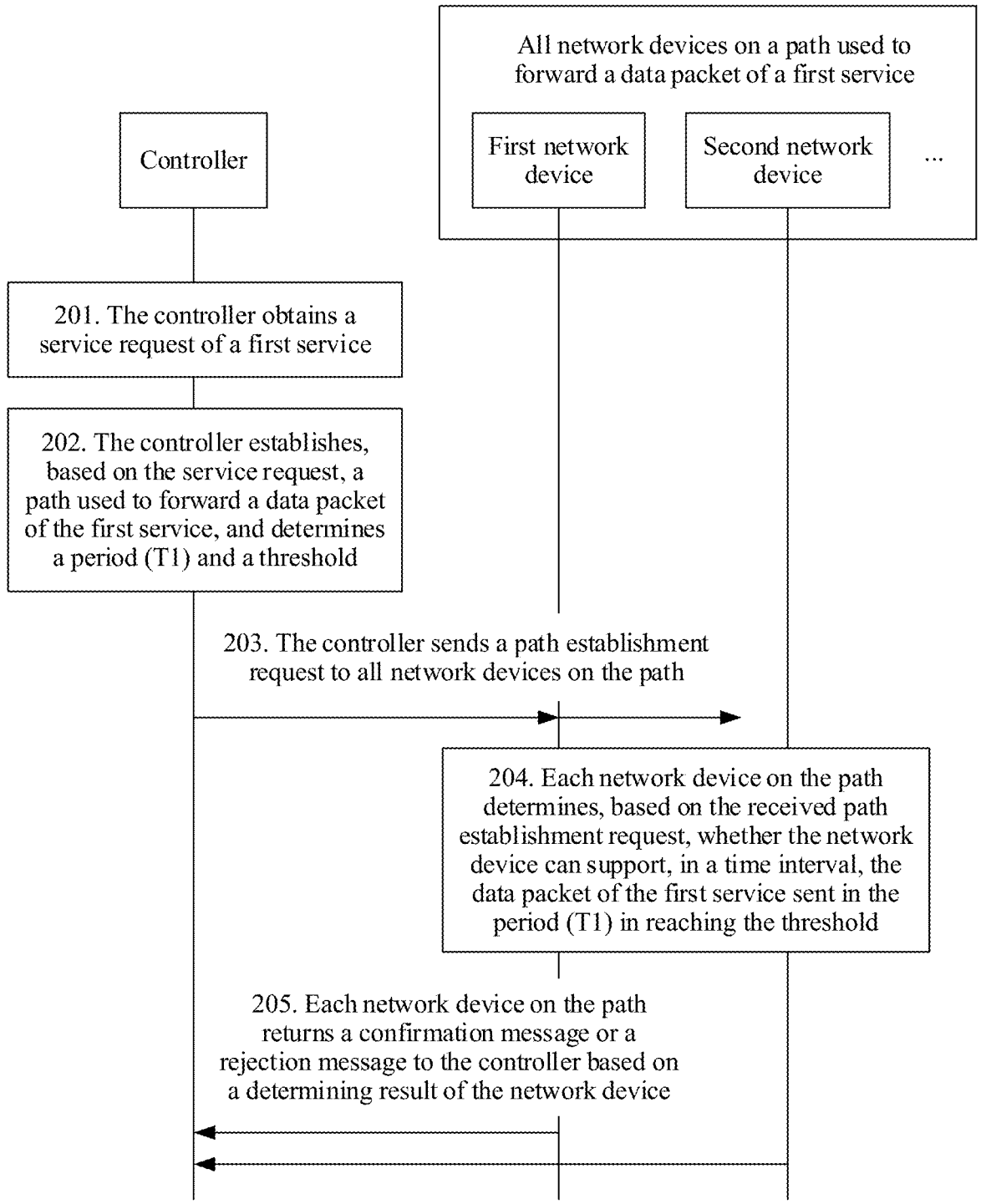
FIG. 2b is a flowchart of another service forwarding method according to an embodiment of this application.

If the method provided in the embodiments of this application is applied to the network shown in FIG. 1b, before a data packet of a service is forwarded, the method further includes a process of establishing a path used to forward the data packet of the service. As shown in FIG. 2b, the method specifically includes the following steps.

201. A controller obtains a service request of a first service.

The first service is a low-latency service. A low-latency service is a real-time service that has a specific requirement on an indicator of a network transmission delay. For example, the low-latency service may be a financial and electronic transaction service, a video conference service, a touch-based Internet service, an Internet of Vehicles service, a fifth generation (5G) mobile bearer network service, or a live broadcast service of a competition.

Specifically, the controller may obtain the service request of the first service from user equipment, and the service request includes information such as a first delay ($t_m$) and a time interval. The first delay ($t_m$) is a transmission delay value allowed during transmission of the first service from an ingress node to an egress node. The first delay ($t_m$) includes a transmission delay value generated by a physical link on a path used to forward the first service and a transmission delay value generated by each node included on the path. The time interval is a time period for transmitting the data packet of the first service on the path, for example, ($t_1$, $t_2$). In this case, according to a transmission requirement of the first service, the total transmission delay on the path used to forward the first service in ($t_1$, $t_2$) should be less than or equal to the first delay ($t_m$).

202. The controller establishes, based on the service request, the path used to forward the data packet of the first service, and determines a period ($T_1$) and a threshold.

For a specific implementation, refer to step 102. Details are not described herein again.

203. The controller sends a path establishment request to all network devices on the path.

Specifically, the controller sends a path establishment request to all the network devices on the determined path used to forward the data packet of the first service, and the path establishment request includes the time interval, the period ($T_1$), and a second rate.

204. Each network device on the path determines, based on the received path establishment request, whether the network device can support, in the time interval, the data packet of the first service sent in the period ($T_1$) in reaching the threshold.

Specifically, each of the network devices on the path may obtain, based on the path establishment request, information about the time interval, the period ($T_1$), and the second rate, and the threshold is less than or equal to the product of the period ($T_1$) and the second rate. Further, a determining method for each network device to determine whether the network device can support, in the time interval, the data packet of the first service sent in the period ($T_1$) in reaching the threshold may be similar to the implementation, in step 103, for the first network device to determine, based on the service request, whether the first network device can support, in the time interval, the data packet of the first service sent in the period ($T_1$) in reaching the threshold.

For example, as shown in FIG. 1b, it is assumed that the path, established in the MPLS network, used to forward the data packet of the first service is PE 1-P 1-P 2-PE 2. In this case, after determining the period ($T_1$) and the threshold, the controller sends a path establishment request to PE 1, P 1, P 2, and PE 2, and the path establishment request includes the time interval, the period ($T_1$) and the second rate. After receiving the path establishment request, PE 1, P 1, P 2, and PE 2 separately determine whether they can support, in the time interval, the data packet of the first service sent in the period ($T_1$) in reaching the threshold.

205. Each network device on the path returns a confirmation message or a rejection message to the controller based on a result determined by the network device.

Specifically, if a network device on the path determines that the network device can support, in the time interval, the data packet of the first service sent in the period ($T_1$) in reaching the threshold, the network device reserves a corresponding resource, and returns a confirmation message to the controller. If a network device on the path determines that the network device cannot support, in the time interval, the data packet of the first service sent in the period ($T_1$) in reaching the threshold, the network device returns a rejection message to the controller, and the controller re-determines a path used to forward the data packet of the first service.

For example, with reference to the example in step 204, if PE 1, P 1, P 2, and PE 2 all determine that they can support, in the time interval, the data packet of the first service sent in the period ($T_1$) in reaching the threshold, each of PE 1, P 1, P 2, and PE 2 sends a confirmation message to the controller. The controller receives four confirmation messages, and determines that the path used to forward the data packet of the first service is successfully established. If any network device on the path returns a rejection message, for example, PE 1 returns a rejection message while P 1, P 2, and PE 3 return confirmation messages, the controller recalculates a route and determines a new path used to forward the data packet of the first service.

Figure 3:
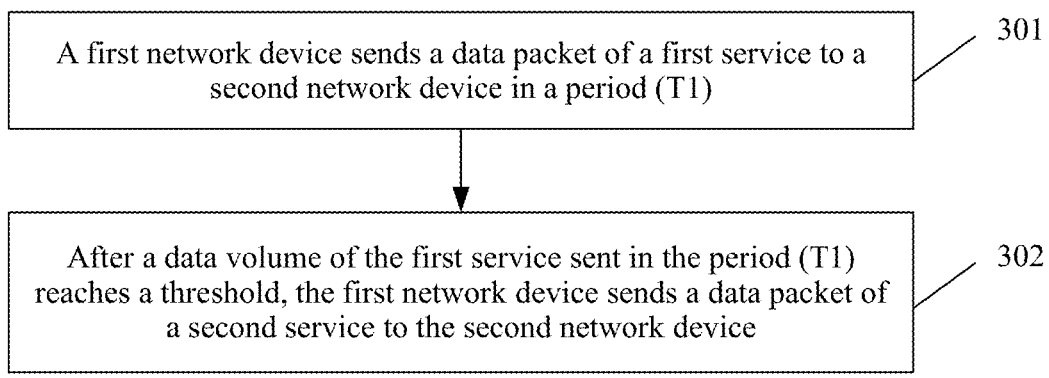
FIG. 3 is a flowchart of another service forwarding method according to an embodiment of this application.

After a path used to forward a data packet of a first service is established, an exemplary service forwarding method provided in an embodiment of this application, as shown in FIG. 3, may include the following steps.

301. A first network device sends a data packet of a first service to a second network device in a period ($T_1$).

For example, the first network device may be an ingress node or an intermediate node, in an MPLS network, on a path used to forward the first service. The second network device is a next-hop node on the path used by the first network device to forward the first service.

Specifically, after receiving the data packet of the first service, the first network device starts a timer at a moment $t_1$, where timing duration of the timer is the period ($T_1$); and starts to send the data packet of the first service to the second network device.

The period ($T_1$) is a value determined based on a delay allowed by a device for forwarding the data packet of the first service. If the first network device is an ingress node, for details of obtaining the period ($T_1$), refer to step 102 or step 204; or if the first network device is an intermediate node, for details of obtaining the period ($T_1$), refer to step 104 or step 204. Details are not described herein again.

302. After a data volume of the first service sent in the period ($T_1$) reaches a threshold, the first network device sends a data packet of a second service to the second network device.

The threshold is a maximum value of a total quantity of bytes of the data packet of the first service that is allowed to be sent on the path in the period ($T_1$). If the first network device is an ingress node, for details of obtaining the threshold, refer to step 102 or step 204; or if the first network device is an intermediate node, for details of obtaining the threshold, refer to step 104 or step 204. Details are not described herein again.

It should be noted that a path used by the first network device to transmit the data packet of the second service overlaps a path used by the first network device to transmit the data packet of the first service. For example, the path used to transmit the data packet of the first service includes the first network device, the second network device, and a path between the two network devices. The path used to transmit the data packet of the second service includes the first network device, the second network device, and the path between the two network devices. In this case, the first network device, the second network device, and the path between the two network devices form an overlapping path. Because the path used to forward the first service and the path used to forward the second service have an overlapping portion, the first network device cannot transmit the first service and the second service at the same time. In addition, because it needs to preferentially ensure that a transmission delay of forwarding the data packet of the first service is equal to or less than a first delay, the first network device preferentially forwards the data packet of the first service.

When the data volume of the first service sent in the period ($T_1$) reaches the threshold, this is an indication that the first network device can ensure that the transmission delay of forwarding the data packet of the first service is equal to or less than the first delay, transmission of the data packet of the first service can be suspended, and transmission of the data packet of the second service may start. Alternatively, although the data volume of the data packet of the first service does not reach the threshold, if a packet queue corresponding to the first service is empty at this moment, indicating that no data packet of the first service needs to be transmitted at this moment, the first network device may start to transmit the data packet of the second service.

However, it should be noted that if the data amount of the first service sent by the first network device in the period ($T_1$) is unlimited, the first network device will probably transmit the data packet of the first service uninterruptedly. Data packets of other services can be transmitted only after transmission of the data packet of the first service is complete, and this seriously affects service quality of other services, for example, the second service and the third service. The second service may be a non-low-latency service that has no specific requirement on an indicator of a network transmission delay. But an allowable transmission delay value of the third service is less than that of the first service. Therefore, a threshold needs to be set for the data volume of the first service forwarded by the first network device. In this way, it can be ensured that a network transmission delay of the first service can be less than the first delay, and that transmission of other services will not be affected.

Therefore, in a time period from $t_1$ to $t_2$, a timer is periodically restarted, and in each period ($T_1$), the first network device preferentially forwards the data packet of the first service, to allow the data volume of the first service to reach the threshold. In this way, it can be ensured that the transmission delay of the first service in the MPLS network is always equal to or less than a transmission delay allowed by the first service.

This embodiment of this application provides a service forwarding method. In the prior art, the first network device preferentially forwards a packet queue corresponding to a low-latency service, but cannot guarantee that network transmission of the low-latency service is less than a first delay. However, in this application, a time interval for sending the low-latency service is divided into a plurality of periods, and each period is $T_1$. In $T_1$, a data packet of the low-latency service is preferentially forwarded, to allow the data volume of the forwarded low-latency service to reach a threshold. In this way, the transmission delay value of the low-latency service from an ingress node to an egress node can be accurately controlled, for example, to be less than the first delay, in order to meet a service quality requirement of the low-latency service.

Figure 4:
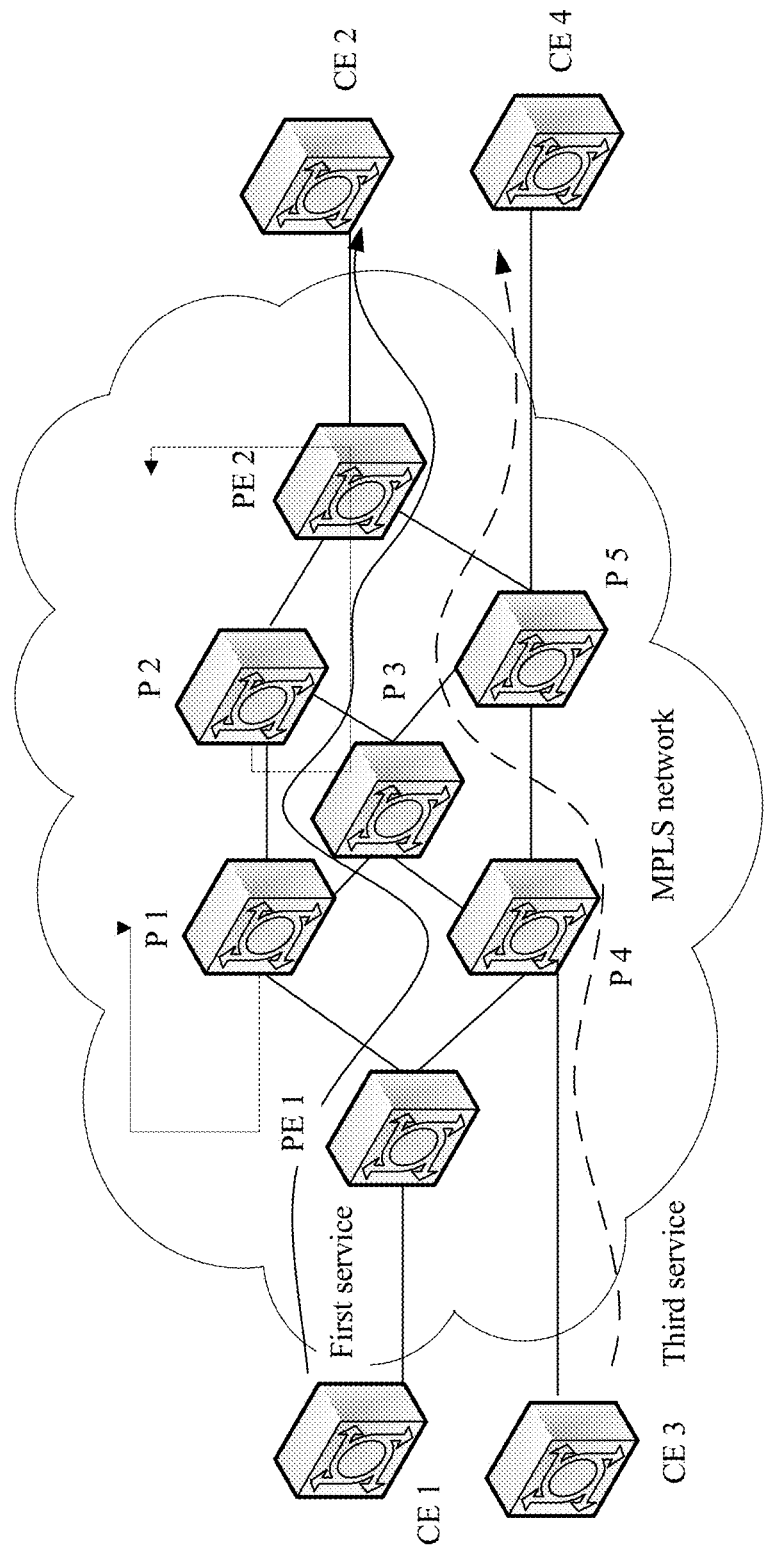
FIG. 4 is a schematic diagram of a service forwarding method according to an embodiment of this application.
Figure 5:
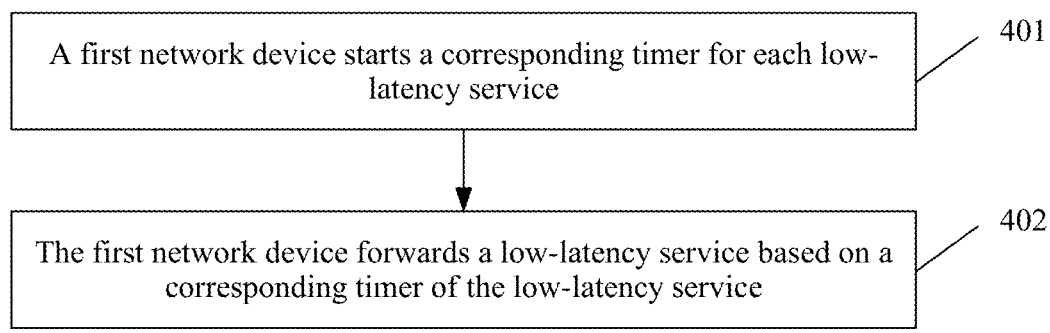
FIG. 5 is a flowchart of another service forwarding method according to an embodiment of this application.

In one scenario, on a first network device, a plurality of low-latency services need to be transmitted in a same time period, as shown in FIG. 4. It is assumed that a path used to forward a data packet of a first service is PE 1-P 4-P 3-P 2-PE 2, and a path used to forward a data packet of a third service is P 4-P 3-P 5. In this case, each of P 4 and P 3 may receive the data packet of the first service and the data packet of the third service in a same time period. As shown in FIG. 5, the service forwarding method forwarding the data packet of the first and third service includes the following steps.

401. The first network device starts a separate timer for each low-latency service.

The period of the timer of each low-latency service is determined by the first network device based on a delay allowed by a data packet of each low-latency service. For a specific determining method, refer to step 101. Details are not described herein again.

Figure 6:
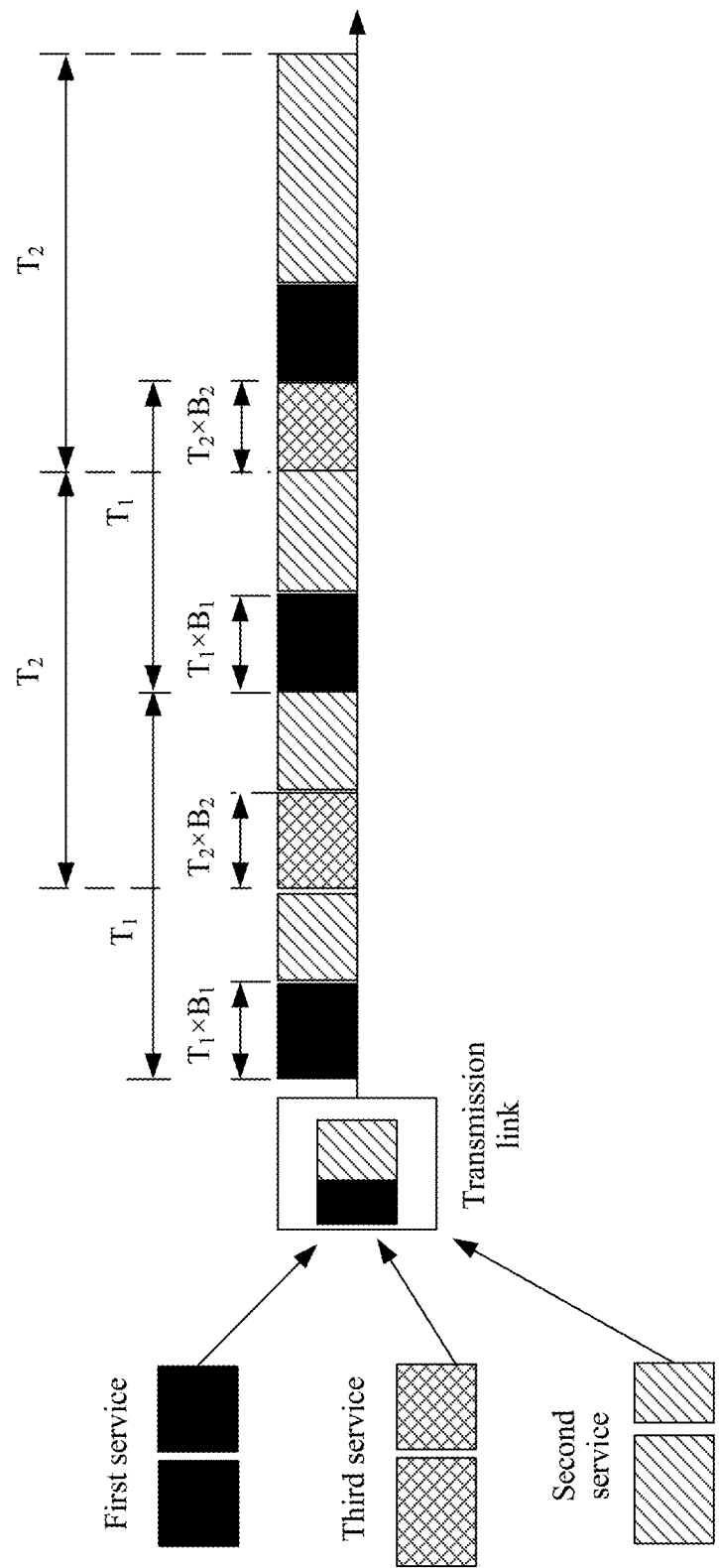
FIG. 6 is a schematic diagram of another service forwarding method according to an embodiment of this application.

For example, as shown in FIG. 6, it is assumed that the first network device needs to transmit a data packet of a first service, a data packet of a second service, and a data packet of a third service in a same time period. The first service and the third service are low-latency services, and the second service is a non-low-latency service. According to the foregoing method, it may be determined that a timer period of the first service is $T_1$, and a timer period of the third service is $T_2$, where $T_1$ is less than $T_2$. In this case, the first network device starts a first timer for the first service and starts a second timer for the third service. Timing duration of the first timer is $T_1$, and timing duration of the second timer is $T_2$.

402. The first network device forwards a low-latency service based on a corresponding timer of the low-latency service.

For example, as shown in FIG. 6, a maximum value ($B_1$) of a total quantity of bytes of the data packet of the first service that is allowed to be sent in a unit time on a path of the first service may be determined according to the foregoing method. In this case, the first network device preferentially forwards the data packet of the first service within the timing duration $T_1$ of the first timer, and starts to forward the data packet of the second service only when a data volume of the forwarded first service reaches $T_1 \times B_1$, or a packet queue corresponding to the first service is empty. Because $T_1 \times B_1$ equals the threshold, $B_1$ can be determined from the threshold and $T_1$. After the timing duration of the first timer reaches $T_1$, the first network device restarts the first timer, the timing duration is still $T_1$, and the first network device continues to preferentially forward the data packet of the first service. By analogy, the operation ends when a sending time of the first service ends.

At the same time, a maximum value ($B_2$) of a total quantity of bytes of the data packet of the third service that is allowed to be sent in a unit time on a path of the third service may be determined according to the foregoing method. In this case, the first network device preferentially forwards the data packet of the third service in the timing duration $T_2$ of the second timer. The first network device starts to forward the data packet of the second service when a data volume of the forwarded third service reaches $T_2 \times B_2$ or a packet queue corresponding to the third service is empty. When the timing duration of the second timer reaches $T_2$, the first network device restarts the second timer, the timing duration is still $T_2$, and the first network device continues to preferentially forward the data packet of the third service. By analogy, the operation ends when a sending time of the third service ends. It can be learned that the two processes of forwarding the data packet of the first service and forwarding the data packet of the third service by the first network device are independent and do not interfere with each other.

It should be noted that if the first service and the third service coincide at a time point, it may be stipulated in advance that the data packet of a low-latency service that arrives first is forwarded first, before the data packet of a low-latency service that arrives later is forwarded. Alternatively, a service that allows a smaller delay value is forwarded first. The arrangement is not limited to the embodiments described herein.

In this way, when the first network device needs to forward data packets of a plurality of low-latency services in a same time period, this application can also ensure that network transmission of each low-latency service can meet a requirement of a minimum delay value allowed by the low-latency service, to meet service requirements of the plurality of services.

Figure 7:
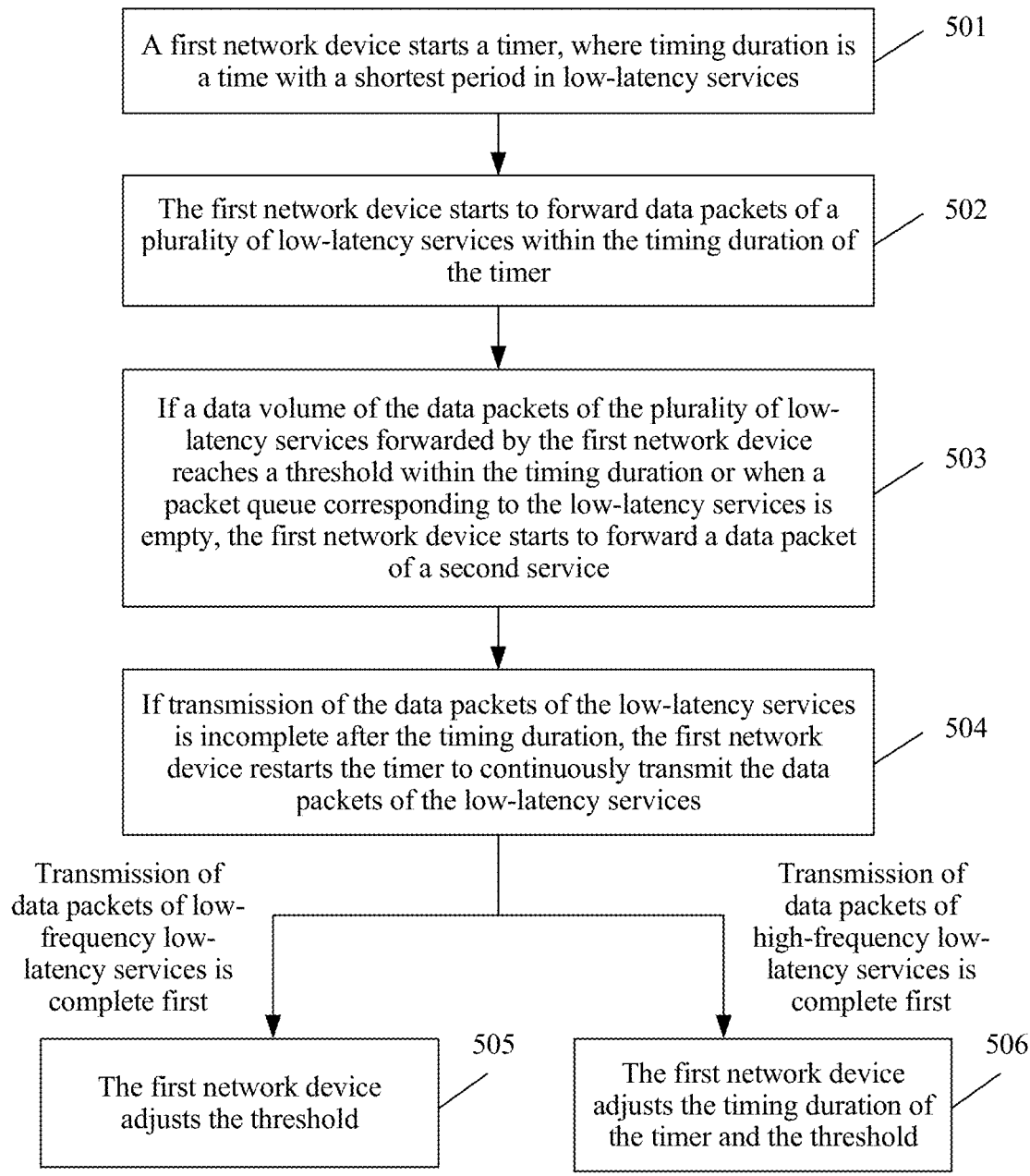
FIG. 7 is a flowchart of another service forwarding method according to an embodiment of this application.

Considering that on a first network device, a plurality of low-latency services need to be transmitted in a same time period, as shown in FIG. 4, it is assumed that a path used to forward a data packet of a first service is PE 1-P 4-P 3-P 2-PE 2, and a path used to forward a data packet of a third service is P 4-P 3-P 5. In this case, each of the P 4 and the P 3 may receive the data packet of the first service and the data packet of the third service in a same time period. An embodiment of this application further provides a service forwarding method, as shown in FIG. 7, that includes the following steps.

501. The first network device starts a timer, where the timing duration is the duration with a shortest corresponding period in a plurality of low-latency services.

Specifically, the first network device uses only one timer, and correspondingly adjusts the timing duration of the timer based on a specific low latency service that is being transmitted.

Figure 8:
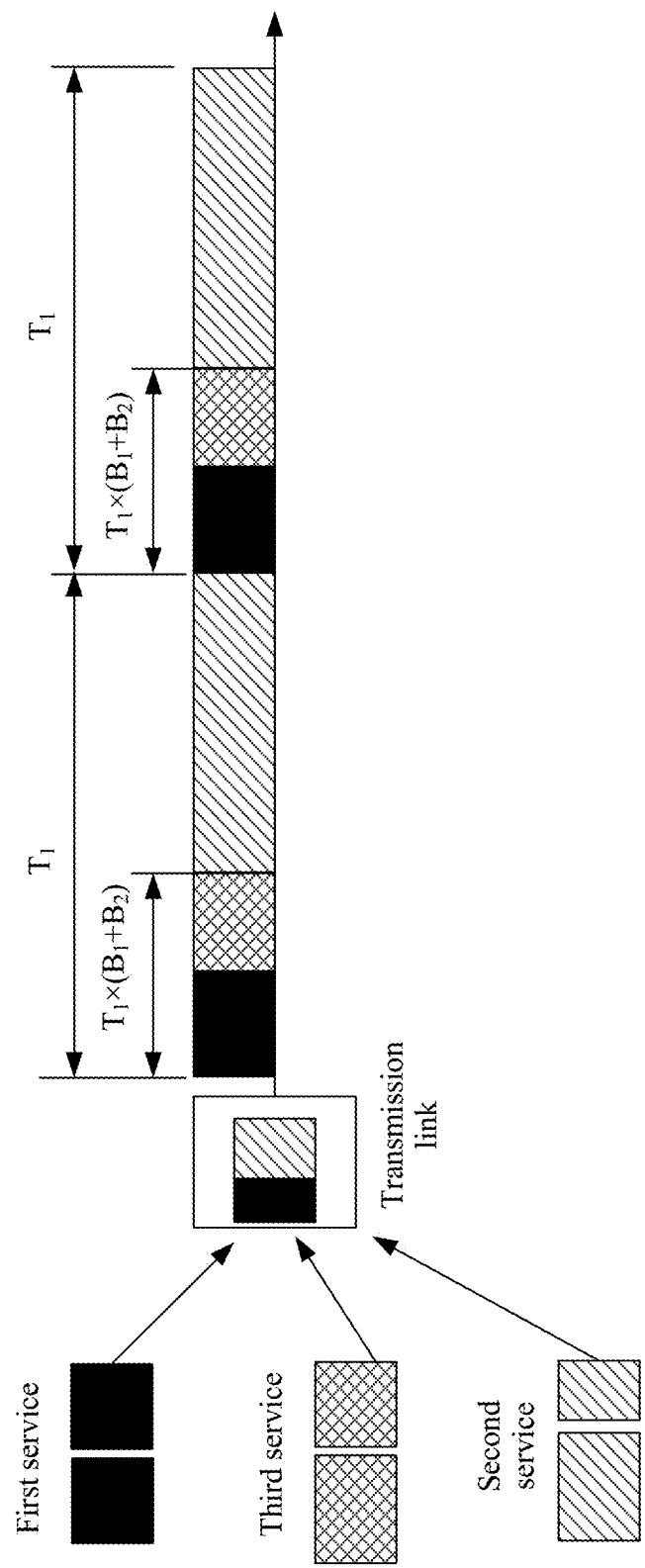
FIG. 8 is a schematic diagram of another service forwarding method according to an embodiment of this application.

For example, as shown in FIG. 8, it is assumed that the first network device needs to transmit a first service, a second service, and a third service in a same time period. The first service and the third service are low-latency services, and the second service is a non-low-latency service. In addition, a transmission delay value allowed by the third service is greater than a transmission delay value allowed by the first service. According to the foregoing method, it may be determined that a timer period of the first service is $T_1$, and a timer period of the third service is $T_2$, where $T_1$ is less than $T_2$. In this case, the first network device starts the timer, and sets the timing duration of the timer as $T_1$.

502. The first network device starts to forward data packets of a plurality of low-latency services within the timing duration of the timer.

For example, as shown in FIG. 8, the first network device starts to forward data packets of the first service and the third service within $T_1$.

503. If a data volume of the data packets of the plurality of low-latency services forwarded by the first network device reaches a threshold within the timing duration or when a packet queue corresponding to the low-latency services is empty, the first network device starts to forward the data packet of the second service.

The threshold is the product of a sum of maximum values of total quantities of bytes of the data packet of the plurality of low-latency services that is allowed to be sent in a unit time on a path of the plurality of low-latency services and the timing duration of the timer.

For example, as shown in FIG. 8, a maximum value ($B_1$) of a total quantity of bytes of the data packet of the first service that is allowed to be sent in a unit time on a path of the first service and a maximum value ($B_2$) of a total quantity of bytes of the data packet of the third service that is allowed to be sent in a unit time on a path of the third service may be determined according to the foregoing method. In this case, the first network device preferentially ensures that a data volume of the transmitted first service and third service reaches $T_1 \times (B_1 + B_2)$. When the quantity of bytes of the first service and the third service reaches $T_1 \times (B_1 + B_2)$, or a packet queue corresponding to the first service and a packet queue corresponding to the third service are empty, the data packet of the second service starts to be forwarded.

504. If transmission of the data packets of the low-latency services is incomplete after the timing duration, the first network device restarts the timer to continuously transmit the data packets of the low-latency services. If transmission of a data packet of a low-frequency low-latency service in the low-latency services is complete first, the first network device re-determines a threshold, in other words, performs step 505. If transmission of a data packet of a high-frequency low-latency service in the low-latency services is complete first, the first network device re-determines a period and a threshold, in other words, performs step 506.

For example, as shown in FIG. 8, because $T_1$ is less than $T_2$, the first service is a high-frequency low-latency service, and the third service is a low-frequency low-latency service.

505. The first network device adjusts the threshold.

Figure 9:
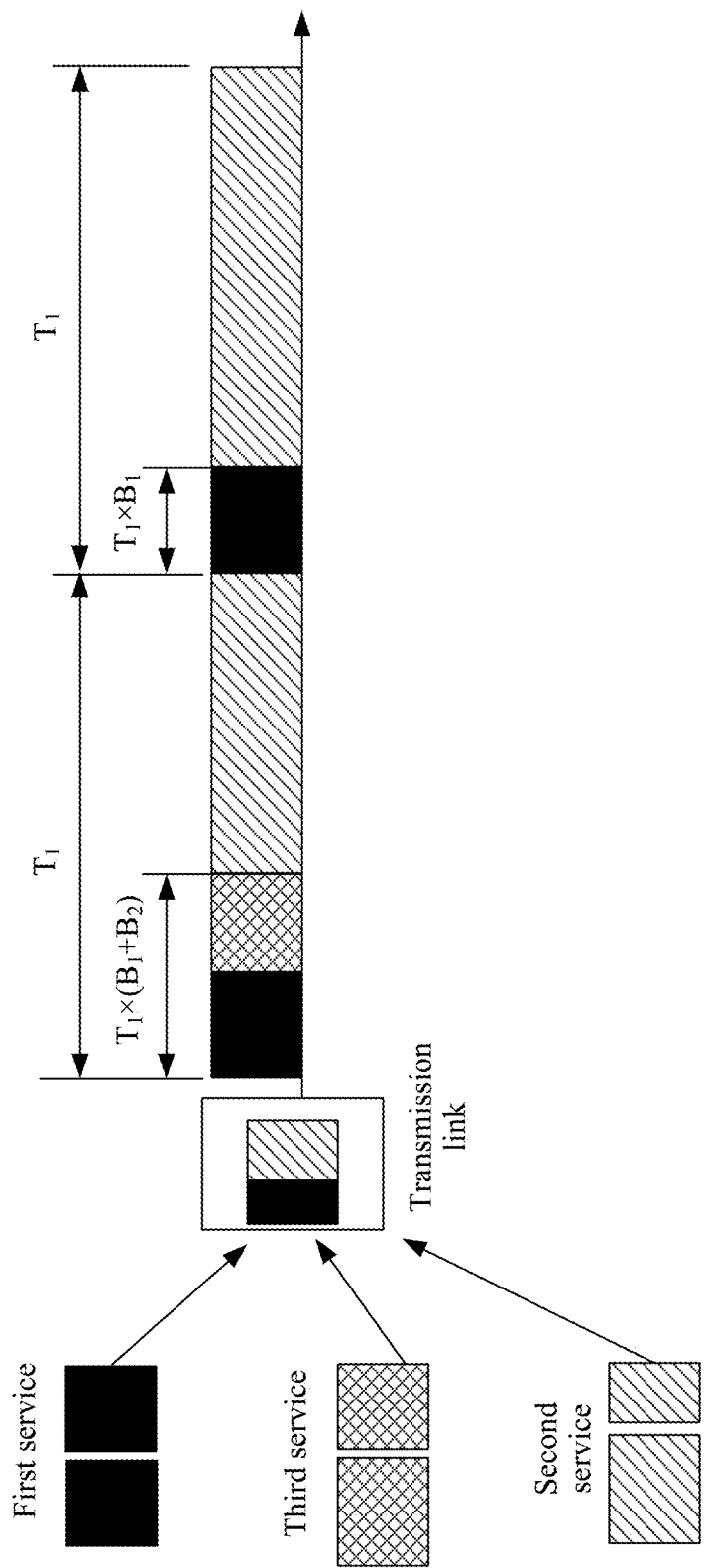
FIG. 9 is a schematic diagram of another service forwarding method according to an embodiment of this application.

For example, as shown in FIG. 9, if transmission of the data packet of the third service is complete first, the first network device adjusts the threshold to $T_1 \times B_1$. In this way, transmission efficiency of a non-low-latency service can be improved while a transmission delay value allowed by the first service is ensured.

506. The first network device adjusts the timing duration of the timer and the threshold.

Figure 10:
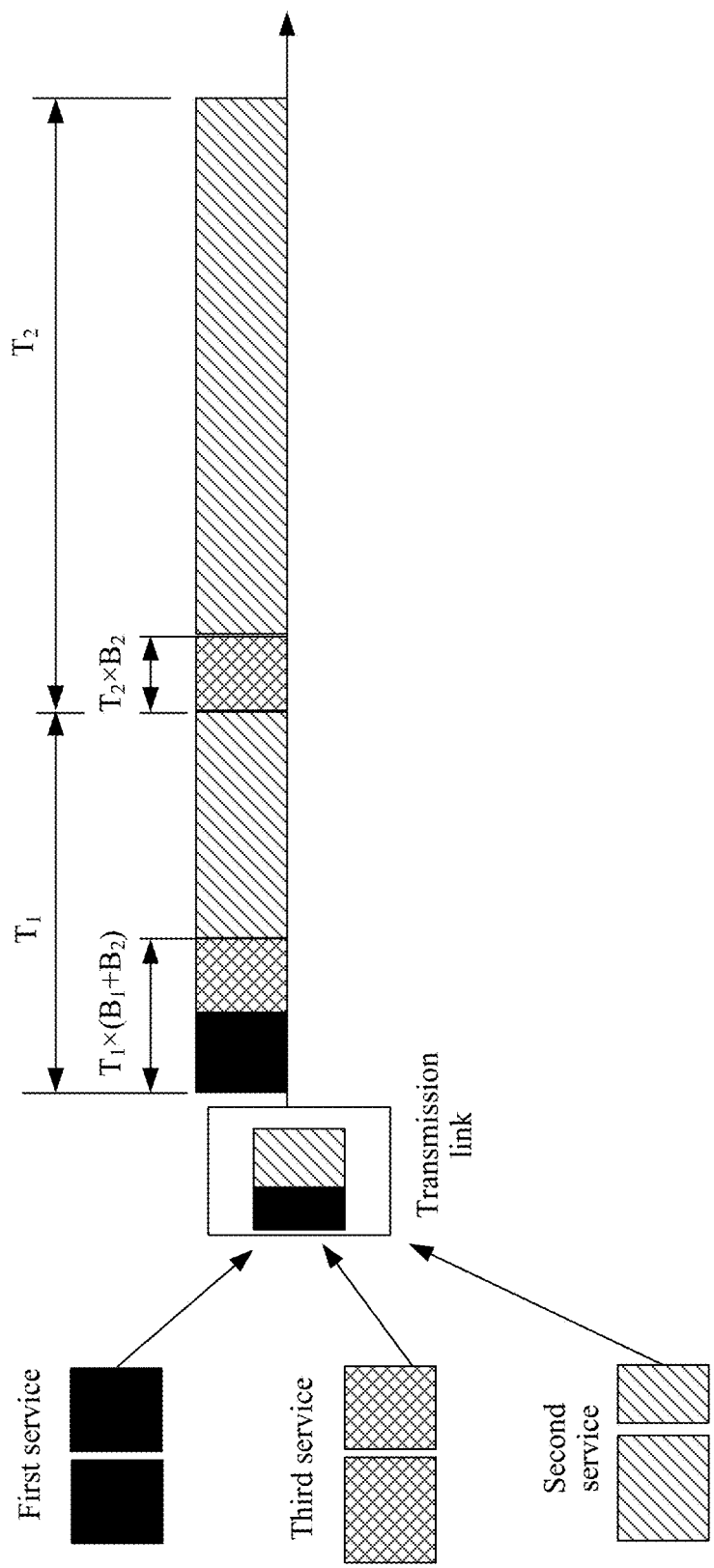
FIG. 10 is a schematic diagram of another service forwarding method according to an embodiment of this application.

For example, as shown in FIG. 10, if transmission of the data packet of the first service is complete first, optionally, the timing duration of a first timer may remain $T_1$, and only the threshold is adjusted to $T_1 \times B_2$. Optionally, the first network device adjusts the timing duration of the timer to $T_2$ and adjusts the threshold to $T_1 \times B_2$. FIG. 10 shows the latter method. In this way, transmission efficiency of a non-low-latency service can be improved while a transmission delay value allowed by the third service is ensured.

Therefore, when the first network device needs to forward data packets of a plurality of low-latency services in a same time period, this application can also ensure that network transmission of each low-latency service meets a requirement of a transmission delay value allowed by the low-latency service. In addition, on the premise of meeting network transmission requirements of the plurality of low-latency services, transmission efficiency of the second service can be appropriately improved.

The solutions provided in the embodiments of this application are mainly described above from a perspective of interaction between the network devices. It may be understood that, to implement the foregoing functions, each network device includes a corresponding hardware structure and/or a software module for implementing each function. A person skilled in the art should be easily aware that, with reference to the examples described in the embodiments disclosed in this specification, units and arithmetic steps may be implemented by hardware or a combination of hardware and computer software in this application. Whether a function is performed by hardware or by hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the network device may be divided into function modules based on the foregoing method examples. For example, each function module may be obtained through division based on each corresponding function, or two or more functions may be integrated into one processing module. The integrated module may be implemented in a form of hardware, or may be implemented in a form of software function module. It should be noted that, in the embodiments of this application, module division is used as an example, and is merely a logical function division. In actual implementation, another division manner may be used.

Figure 11:
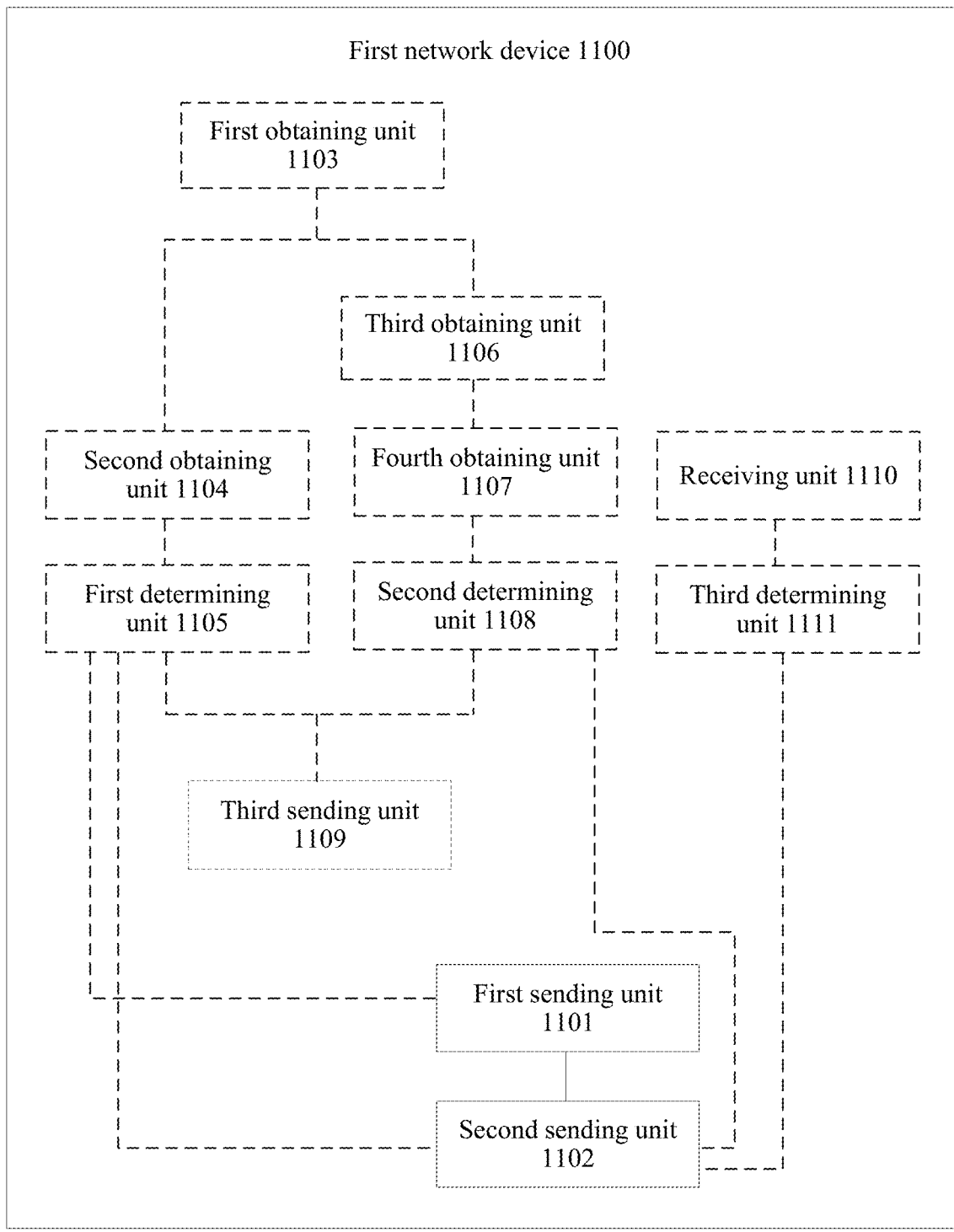
FIG. 11 is a schematic structural diagram of a first network device according to an embodiment of this application.

When each function module is obtained through division based on each corresponding function, FIG. 11 is a possible schematic structural diagram of the first network device in the foregoing embodiments. A first network device 1100 includes: a first sending unit 1101 and a second sending unit 1102. The first sending unit 1101 is configured to send a data packet of a first service to a second network device in a period ($T_1$). The first service is a low-latency service, and the period ($T_1$) is determined based on a delay allowed by a device for forwarding the data packet of the first service. The second sending unit 1102 is configured to send a data packet of a second service to the second network device after a data volume of the first service sent in the period ($T_1$) reaches a threshold. The second service is a non-low-latency service, and the threshold is a value determined based on a maximum transmission rate of the first service.

In this embodiment of this application, optionally, if the first network device is an ingress node, the first network device further includes:

a first obtaining unit 1103, configured to obtain a service request of the first service, where the service request includes a first delay ($t_m$), and the first delay ($t_m$) is a transmission delay value allowed during transmission of the first service from the ingress node to an egress node;

a second obtaining unit 1104, configured to obtain a second delay ($t_d$) and a hop count (h), where the second delay ($t_d$) is a transmission delay value generated by a physical link included on a path, the hop count (h) is a hop count included on the path, and the path is used to send the data packet of the first service; and a first determining unit 1105, configured to determine the period ($T_1$) based on the first delay ($t_m$) the second delay ($t_d$), and the hop count (h), where a value of the period ($T_1$) is less than $(t_m-t_d)/(h+1)$.

In this embodiment of this application, optionally, if the first network device is an ingress node, the first network device further includes:

a third obtaining unit 1106, configured to obtain a first rate (P) and a packet length (M), where the first rate (P) is a maximum value of a quantity of data packets allowed to be sent on the path in a unit time, the packet length (M) is a size of a maximum data packet that is allowed to be sent on the path, and the path is used to send the data packet of the first service;

a fourth obtaining unit 1107, configured to obtain a second rate based on the first rate (P) and the packet length (M), where the second rate is a maximum value of a total quantity of bytes of the data packet of the first service that is allowed to be sent on the path in a unit time; and a second determining unit 1108, configured to determine the threshold based on the period ($T_1$) and the second rate, where the threshold is less than or equal to a product of the period ($T_1$) and the second rate.

In this embodiment of this application, optionally, the service request further includes a time interval. The time interval is a time period for transmitting the data packet of the first service on the path. If the first network device is an ingress node, the first network device further includes: a third sending unit 1109, configured to send a first path establishment request to the second network device. The first path establishment request includes the time interval, the period ($T_1$), and a second rate. The second rate is a maximum value of a total quantity of bytes of the data packet of the first service that is allowed to be sent on the path in a unit time, and the first path establishment request is used to establish the path.

In this embodiment of this application, optionally, if the first network device is an ingress node, the first network device further includes:

a receiving unit 1110, configured to receive the data packet of the first service and the data packet of a third service in a same time period; and a third determining unit 1111, further configured to: if, on a same device, a delay required for sending the data packet of the third service is greater than or equal to a delay required for sending the data packet of the first service, determine the threshold based on the period ($T_1$), a second rate, and a third rate. The threshold is less than or equal to a product of the period ($T_1$) and a sum of the second rate and the third rate. The second rate is a maximum value of a total quantity of bytes of the data packet of the first service that is allowed to be sent on the path in a unit time. The third rate is a maximum value of a total quantity of bytes of the data packet of the third service that is allowed to be sent on the path in a unit time. For how to obtain the third rate, refer to the obtaining manner of the second rate. Details are not described herein again.

Figure 12:
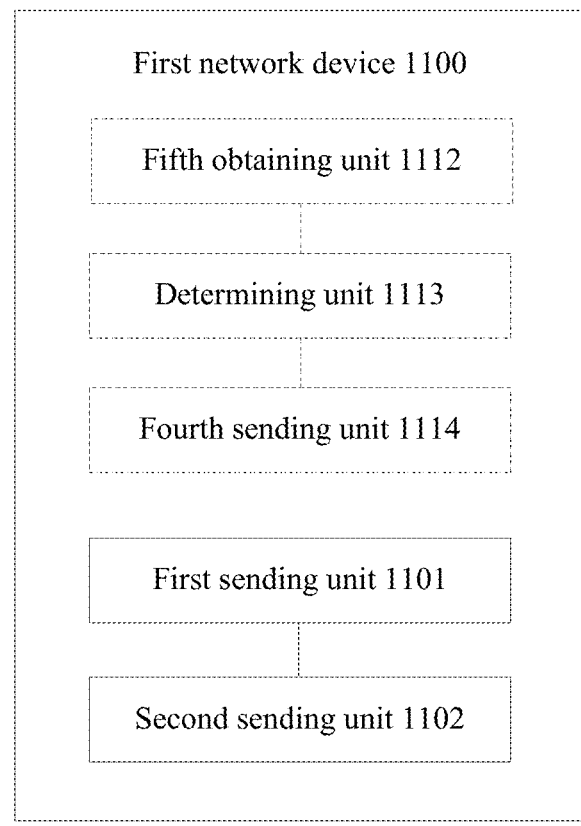
FIG. 12 is a schematic structural diagram of another first network device according to an embodiment of this application.

In this embodiment of this application, optionally, if the first network device is an intermediate node, as shown in FIG. 12, the first network device further includes:

a fifth obtaining unit 1112, configured to obtain a second path establishment request, where the second path establishment request is used to establish a path, the second path establishment request includes a time interval, the period ($T_1$), and a second rate, where the second rate is a maximum value of the data packet of the first service that is allowed to be sent on the path in a unit time, and where the time interval is a time period for transmitting the data packet of the first service on the path;

a determining unit 1113, configured to determine whether the first network device can support, in the time interval, the data packet of the first service sent in the period ($T_1$) in reaching the threshold, where the threshold is a product of the period ($T_1$) and the second rate; and a fourth sending unit 1114, configured to: if the first network device can support, in the time interval, the data packet of the first service sent in the period ($T_1$) in reaching the threshold, send a third path establishment request to the second network device, where the third path establishment request includes the time interval, the period ($T_1$), and the second rate.

Figure 13:
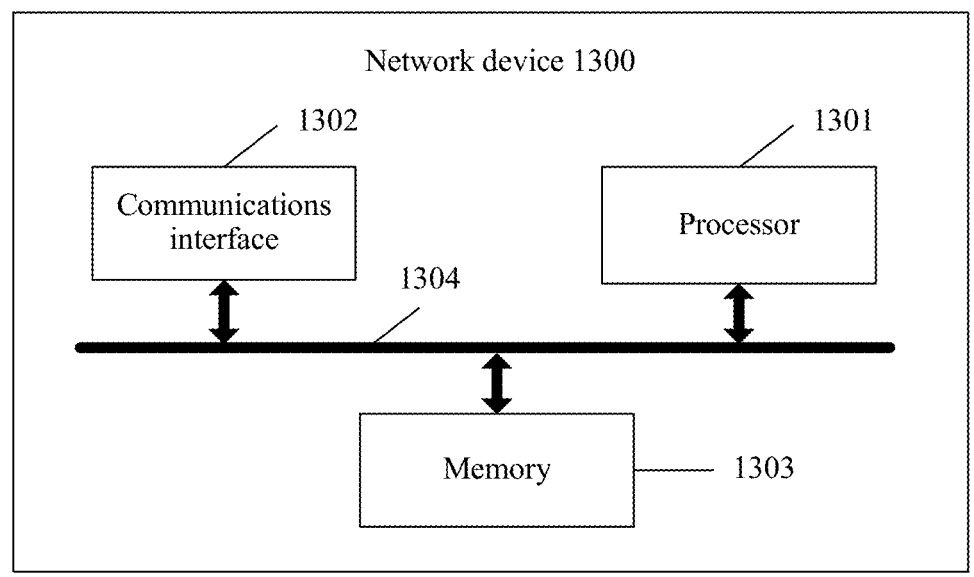
FIG. 13 is a schematic structural diagram of another first network device according to an embodiment of this application.

FIG. 13 is a schematic structural diagram of a network device 1300 according to an embodiment. The network device 1300 includes a processor 1301, a communications interface 1302, a memory 1303, and a bus 1304. The communications interface 1302, the processor 1301, and the memory 1303 are mutually connected via the bus 1304. The bus 1304 may be a peripheral component interconnect (PCI) bus, an extended industry standard architecture (EISA) bus, or the like. The bus may be an address bus, a data bus, a control bus, and the like. For ease of representation, only one thick line is used to represent the bus in FIG. 13, but this should not be interpreted to mean that there is only one bus or only one type of bus.

Method or algorithm steps described in combination with the content disclosed in this application may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

It should be noted that the embodiments in this specification are all described in a progressive manner, each embodiment focuses on a difference from other embodiments. For same or similar parts in the embodiments, mutual reference may be made to these embodiments. An apparatus embodiment is basically similar to a method embodiment, and therefore is described briefly. For related parts, refer to partial descriptions in the method embodiment.

The embodiments disclosed above are described to enable a person skilled in the art to implement or use the present invention. Various modifications to the embodiments are obvious to the person skilled in the art, and general principles defined in this specification may be implemented in other embodiments without departing from the scope of the present invention. Therefore, the present invention will not be limited to the embodiments described in this specification but extends to the widest scope that complies with the principles and novelty disclosed in this specification.

What is claimed is:

1. A service forwarding method, comprising:
   obtaining a service request of a first service, wherein the service request of the first service comprises a first delay ($t_m$), and the first delay ($t_m$) is a transmission delay value allowed for the first service from an ingress node to an egress node;
   determining a period ($T_1$) based on the service request of the first service and a hop count (h) along a path that is used to transmit a data packet of the first service; and
   sending the period ($T_1$) to a first network device configured to forward the data packet of the first service along the path;
wherein the determining a period ($T_1$) according to the service request of the first service and the hot count (h) comprises: determining the period ($T_1$) based on the first delay ($t_m$), a second delay ($t_d$), and the hop count (h), wherein a value of the period ($T_1$) is less than $(t_m-t_d)/(h+1)$, and the second delay ($t_d$) is a transmission delay value generated by a physical link comprised in a path to which the first network device belongs; and the hop count (h) is a hop count comprised in the path, and the path is used to transmit the data packet of the first service.

2. The method according to claim 1, wherein the period ($T_1$) is a duration determined according to a delay allowed by a device that forwards the data packet of the first service.

3. The method according to claim 1, wherein the method further comprises:
   obtaining the second delay ($t_d$) and the hop count (h) after determining the path.

4. The method according to claim 1, wherein the method further comprises:
   determining the threshold based on the period ($T_1$) and a second rate, wherein the threshold is less than or equal to a product of the period ($T_1$) and the second rate, and the second rate is a maximum value of a total quantity of bytes of data packets of the first service that are allowed to be sent on the path per unit time; and
   sending the threshold to the first network device.

5. The method according to claim 4, wherein the method further comprises:
   obtaining the second rate based on a first rate (P) and a packet length (M), wherein the first rate (P) is a maximum quantity of data packets allowed to be sent on a path per unit time, and the packet length (M) is a size of a maximum data packet allowed to be sent on the path.

6. The method according to claim 1, wherein the method further comprises:
   obtaining a second rate based on a first rate (P) and a packet length (M), wherein the first rate (P) is a maximum quantity of data packets allowed to be sent on a path per unit time, and the packet length (M) is a size of a maximum data packet allowed to be sent on the path; and the second rate is a maximum quantity of total bytes of data packets of the first service that are allowed to be sent on the path per unit time; and
   sending the second rate to the first network device.

7. The method according to claim 6, wherein the second rate is a product of the first rate (P) and the packet length (M).

8. The method according to claim 1, wherein the method further comprises:
   sending a time interval to the first network device, wherein the time interval is a time period in which the data packet of the first service is transmitted on the path.

9. A service forwarding apparatus, wherein the apparatus is disposed in a controller and comprises:
   a processor; and
   a storage medium coupled to the processor and storing programming instructions for execution by the processor, the programming instructions instruct the processor to:
   obtain a service request of a first service, wherein the service request of the first service comprises a first delay ($t_m$), and the first delay ($t_m$) is a transmission delay value allowed for the first service from an ingress node to an egress node;
   determine a period ($T_1$) according to a service request of the first service and a hop count (h) along a path that is used to transmit a data packet of the first service;
   send the period ($T_1$) to a first network device configured to forward the data packet of the first service along the path; and
   determine the period ($T_1$) based on the first delay ($t_m$), a second delay ($t_d$), and the hop count (h), wherein a value of the period ($T_1$) is less than $(t_m-t_d)/(h+1)$, and the second delay ($t_d$) is a transmission delay value generated by a physical link comprised in a path to which the first network device belongs.

10. The apparatus according to claim 9, wherein the period ($T_1$) is a duration determined according to a delay allowed by a device that forwards the data packet of the first service.

11. The apparatus according to claim 9, wherein the programming instructions further instruct the processor to:
obtain the second delay (td) and the hop count (h) after the path is determined.

12. The apparatus according to claim 9, wherein the programming instructions further instruct the processor to:
determine a threshold based on the period ($T_1$) and a second rate, wherein the threshold is less than or equal to a product of the period ($T_1$) and the second rate, and the second rate is a maximum value of a total quantity of bytes of data packets of a first service that are allowed to be sent on the path per unit time; and
send the threshold to the first network device.

13. The apparatus according to claim 12, wherein the programming instructions further instruct the processor to:
obtain the second rate based on a first rate (P) and a packet length (M), wherein the first rate (P) is a maximum value of a quantity of data packets allowed to be sent on a path per unit time, and the packet length (M) is a size of a maximum data packet allowed to be sent on the path.

14. The apparatus according to claim 9, wherein the programming instructions further instruct the processor to:
obtain a second rate based on a first rate (P) and a packet length (M), wherein the first rate (P) is a maximum value of a quantity of data packets allowed to be sent on a path per unit time, and the packet length (M) is a size of a maximum data packet allowed to be sent on the path; and the second rate is a maximum quantity of total bytes of data packets of the first service that are allowed to be sent on the path per unit time; and
send the second rate to the first network device.

15. The apparatus according to claim 14, wherein the second rate is a product of the first rate (P) and the packet length (M).

16. The apparatus according to claim 9, wherein the programming instructions further instruct the processor to:
send a time interval to the first network device, wherein the time interval is a time period in which the data packet of the first service is transmitted on the path.

* * * * *

UNITED STATES PATENT AND TRADEMARK OFFICE
CERTIFICATE OF CORRECTION

PATENT NO. : 11,777,857 B2  
APPLICATION NO. : 17/475531  
DATED : October 3, 2023  
INVENTOR(S) : Yuanlong Jiang et al.

Page 1 of 1

It is certified that error appears in the above-identified patent and that said Letters Patent is hereby corrected as shown below:

In the Claims

In Column 18, Line 10, in Claim 4, delete "the" and insert -- a --.

In Column 19, Line 9, in Claim 11, delete "(td)" and insert -- ($t_d$) --.

Signed and Sealed this  
Twenty-eighth Day of November, 2023

Katherine Kelly Vidal  
*Director of the United States Patent and Trademark Office*